Patented Feb. 23, 1932

1,846,113

UNITED STATES PATENT OFFICE

HANS JOHNER, OF BASEL, SWITZERLAND, ASSIGNOR TO SOCIETY OF CHEMICAL INDUSTRY IN BASLE, OF BASEL, SWITZERLAND

DIAZO-PREPARATIONS AND PROCESS OF MAKING SAME

No Drawing. Application filed June 10, 1930, Serial No. 460,299, and in Switzerland June 17, 1929.

The present invention relates to the manufacture of new diazo-preparations. It comprises the process of making these preparations, as well as the new preparations themselves.

It is known that diazo-preparations can be made by precipitating a diazo-solution with an aromatic sulfonic acid.

This procedure is not of general application, since many diazo-compounds are not precipitated or only incompletely precipitated by an aromatic sulfonic acid.

This invention achieves in many cases an essential improvement in the separation of the diazo-compound, by conducting the precipitation by means of such aromatic sulfonic acids of the benzene or of the naphthalene series which contain more than one sulfogroup in presence of a salt of a metal of the second series of the periodic system of the elements, advantageously a salt of magnesium.

The products thus precipitated contain a metal, probably in the form of a double compound, and are characterized by their good solubility, which is remarkable in view of the ease with which they are precipitated. They are very stable and well suited for the production of dyeings by the methods hitherto usual in the so-called ice dyeing or printing. The new products correspond very probably with the general formula

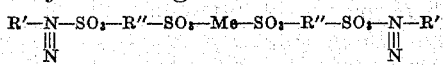

wherein R' stands for the aryl radical of a diazo-compound, R'' for an aromatic nucleus of the benzene or of the naphthalene series, and Me for such a metal of the second series of the periodic system of the elements the hydroxides of which are strong bases. Such metals are magnesium, calcium, strontium and barium.

As to the aromatic polyvalent sulfonic acids of the benzene or of the naphthalene series which are available, there may be named inter alia the benzene-sulfonic acids, toluene-sulfonic acids, chlorobenzene-sulfonic acids, chlorotoluene-sulfonic acids, naphthalene-sulfonic acids, chloro-naphthalene-sulfonic acids which contain more than one sulfo-group.

The following examples illustrate the invention, the parts being by weight:—

Example 1

220 parts of 2:5-dichloraniline-hydrochloride are introduced into 400 parts of ice and 200 parts by volume of hydrochloric acid, and diazotized by addition of the necessary proportion of nitrite solution. Into the diazo-solution are introduced 200 parts of pulverized magnesium chloride ($MgCl_2.6H_2O$). After the salt is dissolved the whole is filtered and the clear diazo-solution is mixed while stirring with 300 parts of sodium m-benzene-disulfonate. There is soon formed a white crystalline precipitate. This is filtered, pressed and dried in a vacuum at 30–40° C. When the operation is conducted without the use of magnesium chloride no diazo-compound is precipitated, even by addition of common salt.

The new diazo-compound is very freely soluble in water and corresponds very probably with the formula

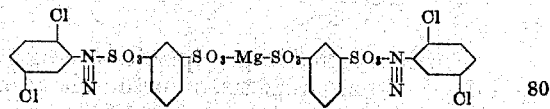

Also with 1:2:4-toluenedisulfonic acid or 1:2:4-chlorobenzenedisulfonic acid or, respectively, naphthalene-2:7-disulfonic acid or, naphthalene-1:3:6-trisulfonic acid, there are obtained valuable double salts. An analogous calcium double salt is also obtained with aid of naphthalene-2:7-disulfonic acid and calcium chloride.

Example 2

25 parts of ortho-anisidine are mixed with 48 parts by volume of concentrated hydrochloric acid and the mixture is cooled externally by means of ice, while it is strongly stirred. To the suspension of the hydrochloride thus obtained, with addition of only a little ice or without such addition, there are gradually added 40 parts by volume of a 5N-sodium-nitrite solution. When the diazotization is complete 21 parts of crystallized magnesium chloride are added and the solution is then filtered. To the clear diazo-solution are added 70 parts of sodium 2:7-naphthalene-disulfonate, either solid or in the form of a concentrated solution. There separates a yellow precipitate, which is filtered and dried in a vacuum at 30-40° C. This product is very stable and very easily soluble in water, from which it may be recrystallized. It corresponds very probably with the formula

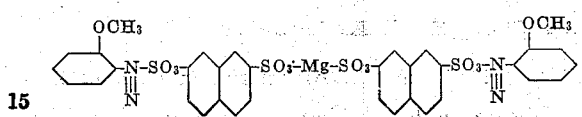

*Example 3*

52 parts of ortho-chloraniline are stirred with 100 parts of water and 100 parts by volume of concentrated hydrochloric acid, the suspension is cooled in ice and 80 volumes of 5N-sodium-nitrite solution are gradually dropped in. When diazotization is complete 82 parts of powdered crystallized magnesium chloride are added, and the solution is then filtered. A boiling hot concentrated solution of 90 parts of sodium 1:5-naphthalene-disulfonate is now added to the clear diazo-solution. On cooling, there crystallizes a nearly white precipitate, which is filtered, freed from liquid by suction or pressure and dried in a vacuum at 30-40° C. The product is very stable and freely soluble in water, from which it can be recrystallized. It corresponds very probably with the formula

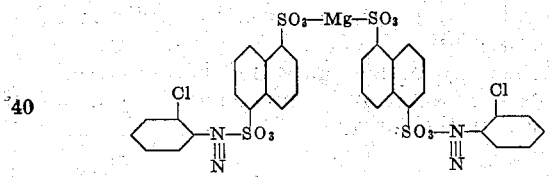

Further valuable precipitates are also obtained from diazotized ortho-nitraniline, magnesium chloride and 1:2:4-toluenedisulfonic acid, chloronaphthalenedisulfonic acids, chlorobenzenedisulfonic acids; from diazotized metanitraniline, magnesium chloride and 1:2:4-toluenedisulfonic acid; from diazotized para-nitraniline, magnesium chloride and 1:2:4-cholorbenzenedisulfonic acid or naphthalene-1:3:6-trisulfonic acid; from diazotized 4-chloro-2-aminodiphenyl-ether, magnesium chloride and 1:2:4-toluenedisulfonic acid; from diazotized 4-nitro-ortho-toluidine, magnesium chloride and chloronaphthalenedisulfonic acid; from diazotized 3-nitro-para-toluidine, magnesium chloride and 1:2:4-chlorobenzenedisulfonic acid; from diazotized aminoazobenzene, magnesium chloride and benzene-1:3-disulfonic acid, and so forth, it being a matter of course that other suitable magnesium salts, such as magnesium sulfate, magnesium bromide, or the like, may be substituted for the magnesium chloride.

If necessary the solubility of the new diazo-compounds can be increased by addition of acid or an easily soluble neutral or acid salt (compare U. S. Patent 1,629,906).

What I claim is:—

1. A process for the manufacture of solid, stable diazo-preparations, consisting in precipitating diazo-compounds of the benzene series from solutions thereof by means of such aromatic sulfonic acids of the benzene and of the naphthalene series which contain more than one sulfo-group in presence of salts of such metals of the second group of the periodic system of the elements the hydroxides of which are strong bases.

2. A process for the manufacture of solid, stable diazo-preparations, consisting in precipitating diazo-compounds of the benzene series from solutions thereof by means of such aromatic sulfonic acids of the benzene and of the naphthalene series which contain more than one sulfo-group in presence of magnesium salts.

3. A process for the manufacture of solid, stable diazo-preparations, consisting in precipitating diazo-compounds deriving from mononuclear aromatic bases from solutions thereof by means of such aromatic sulfonic acids of the benzene and of the naphthalene series which contain more than one sulfo-group in presence of magnesium salts.

4. A process for the manufacture of solid, stable diazo-preparations, consisting in precipitating diazo-compounds deriving from mononuclear aromatic bases of the benzene series from solutions thereof by means of such aromatic sulfonic acids of the benzene and of the naphthalene series which contain more than one sulfo-group in presence of magnesium salts.

5. A process for the manufacture of solid, stable diazo-preparations, consisting in precipitating diazo-compounds deriving from mononuclear aromatic bases of the benzene series from solutions thereof by means of such aromatic sulfonic acids of the benzene series which contain more than one sulfo-group in presence of magnesium salts.

6. A process for the manufacture of solid, stable diazo-preparations, consisting in precipitating diazo-compounds deriving from mononuclear aromatic bases of the benzene series containing halogen from solutions thereof by means of such aromatic sulfonic acids of the benzene series which contain more than one sulfo-group in presence of magnesium salts.

7. A process for the manufacture of solid, stable diazo-preparations, consisting in precipitating diazotized 2:5-dichloroaniline from a solution thereof by means of benzene-1:3-disulfonic acid in presence of magnesium salts.

8. As new products the solid, stable diazo-compounds of the general formula

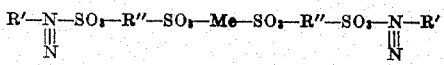

wherein R' stands for the aryl radical of a diazo-compound of the benzene series, R'' for an aromatic nucleus of the benzene and of the naphthalene series, and Me for such a metal of the second series of the periodic system of the elements the hydroxydes of which are strong bases, which products are soluble in water and couple with coupling components to form dyestuffs.

9. As new products the solid, stable diazo-compounds of the general formula

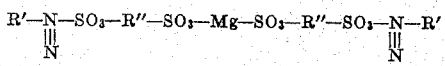

wherein R' stands for the aryl radical of a diazo-compound of the benzene series and R'' for an aromatic nucleus of the benzene and of the naphthalene series, which products are soluble in water and couple with coupling components to form dyestuffs.

10. As new products the solid, stable diazo-compounds of the general formula

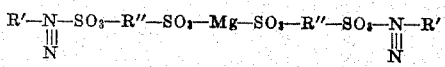

wherein R' stands for the aryl radical of a mononuclear diazo-compound and R'' for an aromatic nucleus of the benzene and of the naphthalene series, which products are soluble in water and couple with coupling components to form dyestuffs.

11. As new products the solid, stable diazo-componds of the general formula

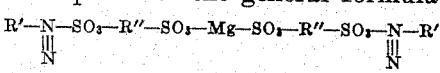

wherein R' stands for the aryl radical of a halogenated diazo-compound of the benzene sereis and R'' for an aromatic nucleus of the benzene and of the naphthalene series, which products are soluble in water and couple with coupling components to form dyestuffs.

12. As new products the solid, stable diazo-compounds of the general formula

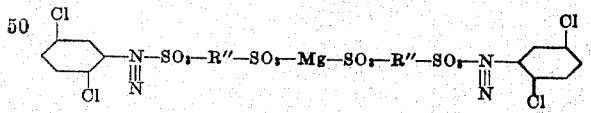

wherein R'' stands for an aromatic nucleus of the benzene series, which products are soluble in water and couple with coupling components to form dyestuffs.

13. As new products the solid, stable diazo-compounds of the general formula

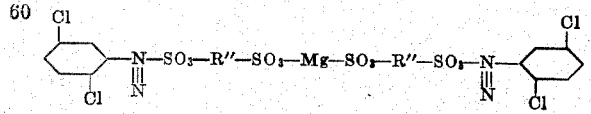

wherein R'' stands for an aromatic nucleus of the benzene series in which the two $SO_3$-groups stand in meta-position to each other, which products are soluble in water and couple with coupling components to form dyestuffs.

14. As new products the solid, stable diazo-compounds of the general formula

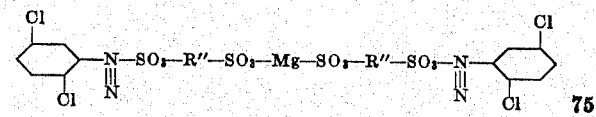

wherein R'' stands for a toluene nucleus in which the two $SO_3$-groups stand in meta-position to each other, which products are soluble in water and couple with coupling components to form dyestuffs.

In witness whereof I have hereunto signed my name this 31st day of May 1930.

HANS JOHNER.